US010015119B2

(12) United States Patent
Yao et al.

(10) Patent No.: US 10,015,119 B2
(45) Date of Patent: Jul. 3, 2018

(54) METHOD AND SYSTEM FOR FILE TRANSFER, INSTANT MESSAGING TERMINAL, AND COMPUTER STORAGE MEDIUM

(71) Applicant: TENCENT TECHNOLOGY (SHENZHEN) COMPANY LIMITED, Shenzhen, Guangdong (CN)

(72) Inventors: Dengke Yao, Shenzhen (CN); Shaowei Su, Shenzhen (CN); Xiaoyong Feng, Shenzhen (CN); Ling Xie, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 450 days.

(21) Appl. No.: 14/105,125

(22) Filed: Dec. 12, 2013

(65) Prior Publication Data

US 2014/0108575 A1 Apr. 17, 2014

Related U.S. Application Data

(63) Continuation of application No. PCT/CN2013/071409, filed on Feb. 5, 2013.

(30) Foreign Application Priority Data

Feb. 24, 2012 (CN) .......................... 2012 1 0044496

(51) Int. Cl.
*G06F 15/16* (2006.01)
*H04L 12/58* (2006.01)
(Continued)

(52) U.S. Cl.
CPC ............ *H04L 51/046* (2013.01); *H04L 29/06* (2013.01); *H04L 51/30* (2013.01); *H04L 67/04* (2013.01);
(Continued)

(58) Field of Classification Search
CPC ......... H04L 67/06; H04L 67/16; H04L 67/02; H04L 67/04; H04L 67/22; H04L 67/42; H04L 67/303; H04L 29/06; H04L 69/40
(Continued)

(56) References Cited

U.S. PATENT DOCUMENTS 6,175,933 B1 * 1/2001 Cadden .................. H04L 29/06
714/15
7,500,010 B2 3/2009 Harrang
(Continued)

FOREIGN PATENT DOCUMENTS

CN 101064910 A 10/2007
CN 101150540 A 3/2008
(Continued)

OTHER PUBLICATIONS

Notification of the First Office Action of ARIPO application No. AP/P/2014/007375, dated Oct. 8, 2015.
(Continued)

*Primary Examiner* — Kyung H Shin
(74) *Attorney, Agent, or Firm* — Oppedahl Patent Law Firm LLC

(57) ABSTRACT

A method and system for file transfer, an instant messaging terminal, and a computer storage medium are described, so as to solve the problem that in case of a poor network environment, too much manual intervention is required when file transfer through an existing instant messaging software encounters a network connection interruption, leading to a low transfer efficiency and poor user. With the present disclosure, an instant messaging terminal is provided with an option of automatic retransfer upon disconnection, an option of automatic reception upon disconnection, and an option of automatic offline-file forwarding upon disconnection, such that when transfer of a file is interrupted, an
(Continued)

instant messaging system can automatically retransfer (or resume the interrupted transfer of) the file, thus enhancing efficiency in file transfer.

11 Claims, 2 Drawing Sheets

(51) Int. Cl.
 H04L 29/08 (2006.01)
 H04L 29/06 (2006.01)
 H04L 29/14 (2006.01)
(52) U.S. Cl.
 CPC .............. *H04L 67/06* (2013.01); *H04L 67/16* (2013.01); *H04L 67/02* (2013.01); *H04L 67/22* (2013.01); *H04L 67/303* (2013.01); *H04L 67/42* (2013.01); *H04L 69/40* (2013.01)
(58) Field of Classification Search
 USPC ........................................ 709/219, 250, 206
 See application file for complete search history.

(56) References Cited

U.S. PATENT DOCUMENTS

| | | | |
|---|---|---|---|
| 7,921,196 | B2 | 4/2011 | Harrang |
| 8,359,358 | B2 | 1/2013 | Bai |
| 8,510,401 | B2 | 8/2013 | Bai |
| 8,583,820 | B2 | 11/2013 | Harrang |
| 8,589,508 | B2 | 11/2013 | Harrang |
| 8,589,585 | B2 | 11/2013 | Harrang |
| 8,671,203 | B2 | 3/2014 | Harrang |
| 8,719,399 | B2 | 5/2014 | Harrang |
| 8,745,260 | B2 | 6/2014 | Harrang et al. |
| 8,812,722 | B2 | 8/2014 | Harrang |
| 8,832,305 | B2 | 9/2014 | Harrang |
| 8,909,807 | B2 | 12/2014 | Harrang |
| 2004/0010626 | A1* | 1/2004 | Gillam .................... H04L 67/06 709/250 |
| 2005/0187959 | A1 | 8/2005 | Jung |
| 2007/0211674 | A1 | 9/2007 | Ragnar Karlberg |
| 2008/0040501 | A1 | 2/2008 | Harrang |
| 2008/0126517 | A1* | 5/2008 | Nakatsuka ............. H04L 67/16 709/219 |
| 2008/0313297 | A1 | 12/2008 | Heron et al. |
| 2009/0024634 | A1 | 1/2009 | Harrang |
| 2009/0024749 | A1 | 1/2009 | Harrang |
| 2009/0164603 | A1 | 6/2009 | Harrang |
| 2009/0254675 | A1 | 10/2009 | Harrang |
| 2009/0265429 | A1 | 10/2009 | Gestsson |
| 2010/0161387 | A1 | 6/2010 | Harrang |
| 2010/0161679 | A1 | 6/2010 | Harrang |
| 2010/0198943 | A1 | 8/2010 | Harrang |
| 2010/0205539 | A1 | 8/2010 | Gestsson et al. |
| 2010/0274871 | A1 | 10/2010 | Harrang |
| 2010/0274872 | A1 | 10/2010 | Harrang |
| 2011/0029619 | A1 | 2/2011 | Bai |
| 2011/0029664 | A1 | 2/2011 | Harrang |
| 2012/0278418 | A1 | 11/2012 | Heron et al. |
| 2013/0073596 | A1 | 3/2013 | Bai |
| 2013/0124679 | A1 | 5/2013 | Harrang et al. |
| 2013/0124747 | A1 | 5/2013 | Harrang et al. |
| 2013/0275478 | A1 | 10/2013 | Bai |
| 2014/0143361 | A1 | 5/2014 | Gestsson et al. |

FOREIGN PATENT DOCUMENTS

| | | |
|---|---|---|
| CN | 101510893 A | 8/2009 |
| CN | 101867619 A | 10/2010 |
| CN | 102355426 A | 2/2012 |
| WO | 2009121057 A2 | 10/2009 |

OTHER PUBLICATIONS

FileZilla resuming from breakpoint [online], [retrieved on: Apr. 4, 2013] Retrieved from the Internet: <URL: http://web.archive.org/web/201100508040036/http://os.51cto.com/art/201103/247424/>. May 8, 2011. (2 pages—see entire document).
International Search Report in international application No. PCT/CN2013/071409, dated May 16, 2013. (2 pages—see entire document).
English Translation of the Written Opinion of the International Search Authority in international application No. PCT/CN2013/071409, dated May 16, 2013. (14 pages—see entire document).
Notification of the First Office Action of Chinese application No. 201210044496.3 , dated Nov. 23, 2016.
Notification of the Second Office Action of Chinese application No. 201210044496.3 , dated Apr. 19, 2017.
English translation of the Notification of the Second Office Action of Chinese application No. 201210044496.3 , dated Apr. 19, 2017.
"FTP instrument FTPRush picture and text operation instruction", ren19890419; Baidu Library; Jul. 19, 2011.
Search Report in Singapore application No. 2013094438, dated Jan. 30, 2015.
Notification to Grant Patent Right for Invention of Chinese application No. 201210044496.3 , dated Sep. 21, 2017.
English translation of the Notification to Grant Patent Right for Invention of Chinese application No. 201210044496.3 , dated Sep. 21, 2017.

* cited by examiner

METHOD AND SYSTEM FOR FILE TRANSFER, INSTANT MESSAGING TERMINAL, AND COMPUTER STORAGE MEDIUM

CROSS REFERENCE TO RELATED APPLICATIONS

This is a continuation application of International Patent Application No.:PCT/CN2013/071409, filed on Feb. 5, 2013, which claims priority to Chinese Patent Application No.:201210044496.3 filed on Feb. 24, 2012, the disclosure of which is incorporated by reference herein in its entirety.

TECHNICAL FIELD

The present disclosure relates to the field of Instant Messaging (IM), and in particular to a method and system for file transfer each of which enables automatic resumption of sending and receiving, an instant messaging terminal, and a computer storage medium.

BACKGROUND

All existing instant messaging systems can transfer files. Thus, a user of an instant messaging system may send a file to a friend or receive a file from a friend, wherein a basic process is that:

(1) a sender sends a file transfer request to a receiver, then waits for a response of the receiver;

(2) after an instant messaging client of the receiver receives the file transfer request, the client prompts the receiver user on the screen to receive the file, and after the receiver user clicks on a receiving button to confirm to receive, the receiver sends the sender a response to agree to receive;

(3) after receiving the response to agree to receive, the sender starts to transmit the file to the receiver;

(4) during the file transfer, if a network connection is accidentally interrupted, then after detecting the transfer disconnection, the sender prompts the sender user to retransfer or to resumption of the transfer, and after the sender user clicks on a retransfer or resuming-transfer button, the sender sends the receiver a retransfer or resuming-transfer request;

(5) after the receiver detects the transfer disconnection, the receiver user is prompted of the transfer disconnection; after the receiver detects the retransfer or resuming-transfer request from the sender, the receiver user is prompted whether to agree to retransfer or to resumption of the transfer; after the receiver user confirms, a retransfer or resuming-transfer response is sent to the sender;

(6) when receiving a response from the sender to agree to retransfer or resumption of the transfer, the receiver retransfers the file, or resumes the transfer of the interrupted file to the sender.

On-line file transfer refers to file transfer through a network connection established directed between the sender and the receiver when both the sender and the receiver of the file are online. Off-line file transfer refers to that when the receiver of the file is offline, the file to be transferred is stored by a server, and is forwarded by the server to the receiver after the receiver goes online.

In such a way, file transfer between friends can be implemented. In a case of a poor network environment in which the transfer is susceptible to interruption, the existing instant messaging system requires manual confirmation from both the sender and the receiver to determine whether a retransfer or resumption of the transfer is needed. The retransfer refers to transferring the whole file once again, whereas the resumption of the transfer refers to resumption of the transfer at a point of interruption, namely, transfer of the remaining part that is not transferred is continued at a location of interruption based on the transferred part of the file.

However, when the transfer is interrupted frequently due to poor network environment, the file sender has to initiate a file sending operation frequently; meanwhile, the file receiver has to initiate a file receiving operation frequently, which is very inconvenient for users. Particularly, when a user at one party is not on scene, the file transfer is unable to be completed.

Therefore, in case of a poor network environment, too much manual intervention is required when file transfer by an existing instant messaging software encounters a network connection interruption, leading to a low transfer efficiency.

SUMMARY

In view of this, it is desired to provide in the present disclosure a method and system for file transfer as well as an instant messaging terminal, so as to enhance efficiency in file transfer.

To this end, a technical solution of the present disclosure is implemented as follows.

According to an aspect of an embodiment of the present disclosure, a method for file transfer which is applied to an instant messaging system includes:

when transfer of a file is interrupted, and when a sender is configured with an option of automatic retransfer upon disconnection, the sender sends an online file-retransfer or resuming-file-transfer request to a receiver; and when transfer of a file is interrupted, and when the receiver is configured with an option of automatic reception upon disconnection, the receiver makes automatically response to a file-retransfer or resuming-file-transfer request from the sender, then the file is retransferred; alternatively, the transfer of the file is resumed.

According to an aspect of an embodiment of the present disclosure, a method for file transfer includes:

when transfer of a file is interrupted, and when a sender is configured with an option of automatic retransfer upon disconnection, an instant messaging terminal which serves as the sender sends automatically an online file-retransfer or resuming-file-transfer request to a receiver, and retransfers the file on line or resumes on line the interrupted transfer of the file to the receiver after a response to confirm receiving by the receiver is received.

According to an aspect of an embodiment of the present disclosure, an instant messaging terminal includes:

a first configuring module arranged to configure or cancel an option of automatic retransfer upon disconnection; and an automatic retransferring module arranged to, when the option of automatic retransfer upon disconnection is configured and when transfer of a file is interrupted, send automatically an online file-retransfer or resuming-file-transfer request to a receiver, and retransfer the file on line or resume on line the interrupted transfer of the file to the receiver after a response to confirm receiving by the receiver is received.

According to an aspect of an embodiment of the present disclosure, another method for file transfer includes:

when an instant messaging terminal at a receiver is configured with an option of automatic reception upon disconnection, and when transfer of a file is interrupted, the instant messaging terminal which serves as the receiver makes automatically response to a file-retransfer or resuming-file-transfer request from the sender by sending the sender a response to confirm receiving, and receives again the file, or resumes reception of the interrupted file.

According to an aspect of an embodiment of the present disclosure, another instant messaging terminal includes:

a second configuring module arranged to configure or cancel an option of automatic reception upon disconnection; and an automatic receiving module arranged to, when the option of automatic reception upon disconnection is configured and when transfer of a file is interrupted, make automatically response to a file-retransfer or resuming-file-transfer request from the sender by sending the sender a response to confirm receiving, and receive again the file, or resume reception of the interrupted file.

According to an aspect of an embodiment of the present disclosure, an instant messaging terminal includes: the first configuring module, the automatic retransferring module, the second configuring module and the automatic receiving module.

According to an aspect of an embodiment of the present disclosure, a system for file transfer includes: a first instant messaging terminal serving as a file sender, including the first configuring module and the automatic retransferring module; a server; and an second instant messaging terminal serving as a file receiver including the second configuring module and the automatic receiving module.

According to an aspect of an embodiment of the present disclosure, a computer storage medium is provided, in which a computer program is stored, which computer program is for executing an aforementioned method for file transfer.

With the embodiments of the present disclosure, an instant messaging terminal is provided with an option of automatic retransfer upon disconnection, an option of automatic reception upon disconnection, an option of automatic offline-file forwarding upon disconnection, such that when transfer of a file is interrupted, an instant messaging system can automatically retransfer the file or resume the interrupted transfer of the file, thus enhancing efficiency in file transfer.

DETAILED DESCRIPTION

Figure 1:
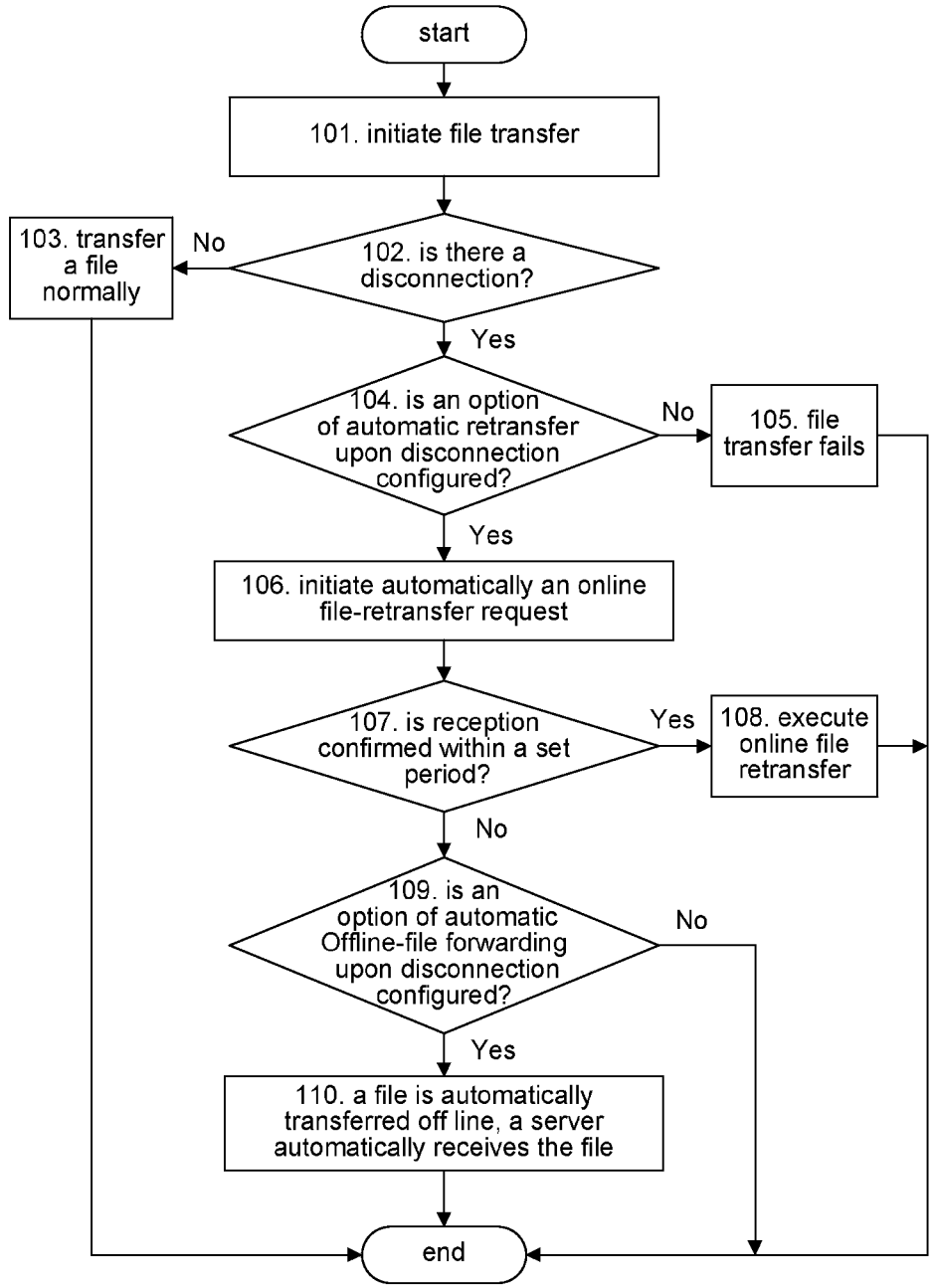
FIG. 1 is a flowchart of a method for sending a file by a sender (e.g. an instant messaging terminal) according to an embodiment of the present disclosure.

FIG. 1 is a flowchart of a method for sending a file by a sender (e.g. an Instant Messaging terminal) according to an embodiment of the present disclosure. The method includes the following steps.

In step 101, a sender sends a file transfer request to a receiver, and after receiving a response to confirm receiving from the receiver, transmits a file to the receiver in a transfer mode such as TCP.

The receiver may be an instant messaging client or an instant messaging server (referred to as a server hereinafter).

In step 102, if during the file transfer, it is detected that the file transfer is accidentally interrupted, for example due to a factor such as a network problem, step 104 is executed, otherwise step 103 is executed.

In step 103, when no accidental interruption of the file transfer is detected, the file transfer between the sender and the receiver is completed normally, and the flow ends.

In step 104, when it is detected that the file transfer is interrupted, it is determined whether the sender is configured with an option of automatic retransfer upon disconnection. If the sender is configured with the option, step 106 is executed, otherwise step 105 is executed.

In step 105, a user is prompted that file transfer fails, and the flow ends.

In some examples, in a case that the sender is not configured with the option of automatic retransfer upon disconnection, instant messaging terminals at both the sender and the receiver may prompt respective users that file transmission fails, the sender user may manually initiate the retransfer or resuming-transfer request again, the receiver user may manually accept the request. If the receiver is configured with an option of automatic reception upon disconnection, when the receiver receives a retransfer or resuming-transfer request sent by the sender, the receiver may automatically send the sender a response to proceed with online file retransfer or resumption of the transfer at an interrupted point.

In step 106, the sender initiates automatically an online file-retransfer or resuming-file-transfer request to the receiver.

In some examples, after the sender is configured with the option of automatic retransfer upon disconnection, when transfer of a file is interrupted, the sender will monitor in real time whether the network is back to normal, and once the network is back to normal, the sender will automatically send the receiver the online file-retransfer or resuming-file-transfer request.

In step 107, after the sender initiates automatically an online file-retransfer or resuming-file-transfer request, the sender waits for a confirming response of the receiver; if no confirming response is received from the receiver within a set period, step 109 is executed, otherwise step 108 is executed.

In step 108, after a confirming response of the receiver is received, online file retransfer or resumption of the transfer may be performed between the sender and the receiver, and the flow ends after transfer completes.

In step 109, the sender determines whether it is configured with an option of automatic offline-file forwarding upon disconnection; if it is configured with the option, step 110 is executed, otherwise a user is prompted that automatic retransfer or resumption of the transfer fails; and the flow ends.

In step 110, the sender initiates automatically an offline file-retransfer or resuming-file-transfer request to a server; after the server returns an acknowledgement, the sender may send the file first to the server for cache; and after the receiver goes on line again, the receiver may receive the file of which transfer is interrupted or resume the interrupted transfer of the file from the server.

With the method for sending a file by a sender according to the embodiments, when accidentally interrupted, a transfer will not be affected negatively as in prior art, as when it is detected that file transfer is accidentally interrupted for example due to a factor such as a network problem, it will be determined whether the sender is configured with the option of automatic retransfer upon disconnection. When the sender is configured with the option, the sender initiates automatically an online file-retransfer or resuming-file-transfer request to the receiver, thus enhancing efficiency in file transfer.

Figure 2:
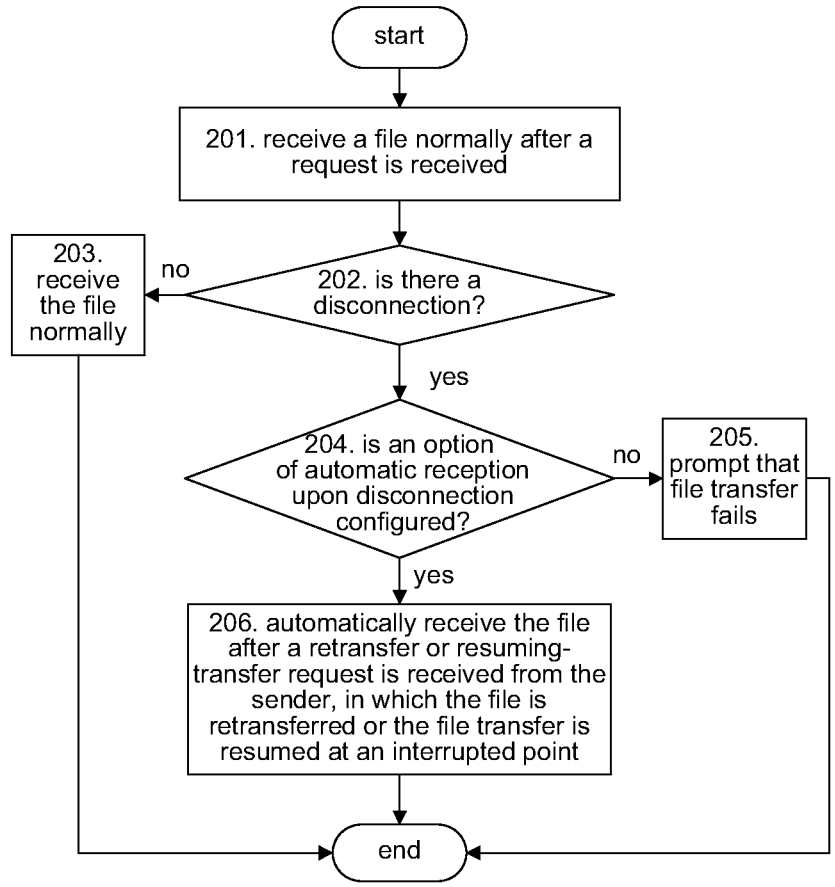
FIG. 2 is a flowchart of a method for receiving a file by a receiver (e.g. an instant messaging terminal) according to an embodiment of the present disclosure.

FIG. 2 is a flowchart of a method for receiving a file by a receiver (e.g. an Instant Messaging terminal) according to an embodiment of the present disclosure. The method includes the following steps.

In step 201, after a receiver receives a file transfer request from a sender and sends the sender a confirming response, file transfer starts between the sender and the receiver.

In step 202, if during the file transfer, it is detected that the file transfer is interrupted, for example due to a network problem, step 204 is executed, otherwise step 203 is executed.

In step 203, when there is no interruption during the file transfer, the file transfer between the sender and the receiver is completed normally, and the flow ends.

In step 204, it is determined whether the receiver is configured with an option of automatic reception upon disconnection. When the receiver is configured with the option, step 206 is executed, otherwise step 105 is executed.

In step 205, a user is prompted that file transfer fails, and the flow ends.

In some examples, when the receiver is not configured with the option of automatic reception upon disconnection and the receiver is a server, the flow ends. When the receiver is not configured with the option of automatic reception upon disconnection and the receiver is an instant messaging terminal, the instant messaging terminal will prompt its user that file transmission fails, and after the receiver receives a file-retransfer or resuming-file-transfer request from the sender, the request may be manually accepted by a user, so as to complete file transfer.

In step 206, when the receiver receives the file-retransfer or resuming-file-transfer request from the sender, the receiver automatically accepts the request of the sender by sending the sender a response to confirm receiving, and a file is retransferred or the file transfer is resumed at an interrupted point.

In some examples, in the flow shown in FIG. 2, both the receiver and the sender may be instant messaging terminals. In some examples, the sender may be a server. In some examples, the receiver may be a server.

With the method for receiving a file by a receiver according to the embodiments, when accidentally interrupted, a transfer will not be affected negatively as in prior art, as when it is detected that file transfer is interrupted for example due to a network problem, it will be determined whether the receiver is configured with the option of automatic reception upon disconnection. If the receiver is configured with such an option, then when the receiver receives a file-retransfer or resuming-file-transfer request initiated by the sender, the receiver automatically accepts the request of the sender by sending the sender a response to confirm receiving, and a file is retransferred or the file transfer is resumed at an interrupted point, thus enhancing efficiency in file transfer.

Figure 3:
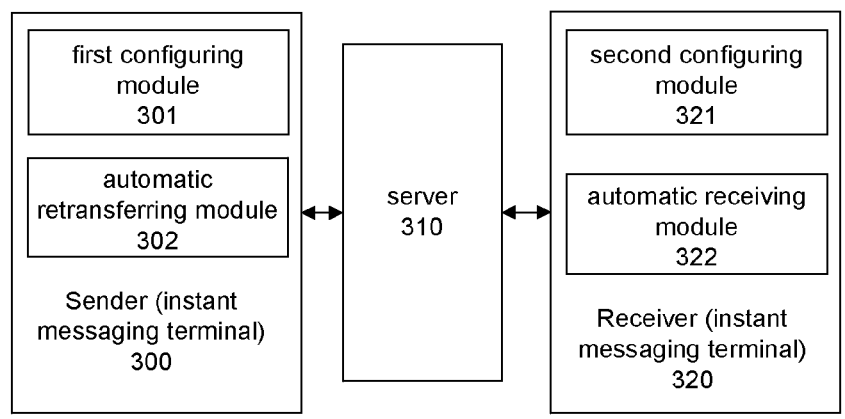
FIG. 3 is a diagram depicting a functional structure of a system for file transfer according to an embodiment of the present disclosure.

FIG. 3 is a schematic diagram of a modularized functional structure of a system for file transfer according to an embodiment of the present disclosure. The system includes a sender 300 (e.g. an instant messaging terminal), a receiver 320 (e.g. an instant messaging terminal), and a server 310.

An instant messaging terminal which may serve as the sender 300 may include:

a first configuring module 301 arranged to configure or cancel an option of automatic retransfer upon disconnection; and an automatic retransferring module 302 arranged to, when the option of automatic retransfer upon disconnection is configured and when transfer of a file is interrupted, send automatically an online file-retransfer or resuming-file-transfer request to a receiver, and retransfer the file on line or resume on line the interrupted transfer of the file to the receiver after a response to confirm receiving by the receiver is received.

In some examples, in the instant messaging terminal serving as the sender 300, the first configuring module 301 may be further arranged to configure a n option of automatic offline-file forwarding. In some examples, the automatic retransferring module may be further arranged to, when the option of automatic offline-file forwarding is configured and in case that no response to confirm receiving by the receiver is received within a set period after the online file-retransfer or resuming-file-transfer request is sent, send automatically an offline file-retransfer or resuming-file-transfer request to the server 310.

An instant messaging terminal which may serve as the receiver 320 may include:

a second configuring module 321 arranged to configure or cancel an option of automatic reception upon disconnection; and an automatic receiving module 322 arranged to, when the option of automatic reception upon disconnection is configured and when transfer of a file is interrupted, make automatically response to a file-retransfer or resuming-file-transfer request from the sender by sending the sender a response to confirm receiving, and receive again, or resume reception of, the file of which transfer is interrupted.

In some examples, opposite to an instant messaging terminal which serves as the receiver, the sender of the file may be an instant messaging terminal or a server.

In some embodiments of the present disclosure, function modules included in an instant messaging terminal which serves as the sender and function modules included in an instant messaging terminal which serves as the receiver are integrated together to implement automatic retransfer (or resumption of the transfer) and automatic reception of a disconnected file.

When implemented in form of a software functional module and sold or used as an independent product, integrated modules of embodiments of the present disclosure may also be stored in a computer-readable storage medium. Based on such an understanding, an essential part of embodiments of the present disclosure or a part contributing to the prior art may appear in form of a software product, which software product is stored in a storage medium, and includes a number of instructions for allowing a computer equipment (such as a personal computer, a server, a network equipment, or the like) to execute all or part of the methods in various embodiments of the present disclosure. The storage medium include various media that can store program codes such as a U disk, a mobile hard disk, a Read-Only Memory (ROM), a Random Access Memory (RAM), a magnetic disk, a CD, and the like. Thus, embodiments of the present disclosure are not limited to any specific combination of hardware and software.

An embodiment of the present disclosure provides a computer storage medium in which a computer program is stored, which computer program is for executing the method for file transfer according to an embodiment of the present disclosure.

What described are various embodiments of the disclosure, and are not intended to limit the scope of the present disclosure.

The invention claimed is:

1. A method for file transfer, the method being applied to an instant messaging system, and comprising:
configuring an option of automatic retransfer upon disconnection for a sender;
when transfer of a file is interrupted and determined that the sender is configured with the option of automatic retransfer upon disconnection, monitoring, by the sender, in real time whether the network connection is back to normal, and sending automatically, by the sender, an online file-retransfer or online resuming-file-transfer request to a receiver after detecting that the network connection is back to normal;
configuring an option of automatic reception upon disconnection for the receiver;
when transfer of a file is interrupted and determined that the receiver is configured with the option of automatic reception upon disconnection, responding to automatically, by the receiver, a file-retransfer or resuming-file-transfer request from the sender and sending the sender a response to confirm receiving;
retransferring, by the sender, the file or resuming the transfer of the file after receiving a response to confirm receiving from the receiver; and
when the sender is configured with an option of automatic offline-file forwarding upon disconnection, sending, by the sender, the file to a server for cache to allow the receiver receive the file or resume the interrupted transfer of the file from the server after the receiver goes on line in case that no response to confirm receiving by the receiver is received within a set period.

2. The method according to claim 1, further comprising:
when both the sender and the receiver are instant messaging terminals, and when the sender is configured with the option of automatic offline-file forwarding upon disconnection, in case that no response to confirm receiving by the receiver is received within the set period, sending automatically, by the sender, an offline file-retransfer or offline resuming-file-transfer request to the server before sending the file to the server.

3. The method according to claim 2, further comprising:
after the sending automatically, by the sender, an offline file-retransfer or offline resuming-file-transfer request to a server,
receiving automatically, by the server, the file transferred by the sender through retransfer or resumed transfer; and
sending automatically, by the server, an offline file-retransfer or offline resuming-file-transfer request to the receiver after the receiver logs in again.

4. A method for file transfer, comprising:
configuring an option of automatic retransfer upon disconnection for a sender;
when transfer of a file is interrupted and determined that the sender is configured with the option of automatic retransfer upon disconnection, monitoring, by an instant messaging terminal which serves as the sender, in real time whether the network connection is back to normal, and sending automatically, by the sender, an online file-retransfer or online resuming-file-transfer request to a receiver after detecting that the network connection is back to normal; and
retransferring the file on line or resuming on line the interrupted transfer of the file to the receiver after a response to confirm receiving by the receiver is received;
when the instant messaging terminal which serves as the sender is configured with an option of automatic offline-file forwarding upon disconnection, sending, by the sender, the file to a server for cache to allow the receiver receive the file or resume the interrupted transfer of the file from the server after the receiver goes on line in case that no response to confirm receiving by the receiver is received within a set period.

5. The method according to claim 4, further comprising:
when the instant messaging terminal which serves as the sender is configured with the option of automatic offline-file forwarding upon disconnection, in case that no response to confirm receiving by the receiver is received within the set period before sending the file to the server,
sending automatically, by the instant messaging terminal which serves as the sender, an offline file-retransfer or offline resuming-file-transfer request to the server.

6. An instant messaging terminal, comprising:
a memory storing instructions; and
a hardware processor executing the instructions to implement a first configuringmodule and an automatic retransferring module, wherein
the first configuring module is arranged to configure or cancel an option of automatic retransfer upon disconnection; and
the automatic retransferring module is arranged to, when the option of automatic retransfer upon disconnection is configured and when transfer of a file is interrupted, monitor in real time whether the network connection is back to normal, send automatically an online file-retransfer or online resuming-file-transfer request to a receiver after detecting that the network connection is back to normal, and retransfer the file on line or resume on line the interrupted transfer of the file to the receiver after a response to confirm receiving by the receiver is received;
wherein the first configuring module is further arranged to configure or cancel an option of automatic offline-file forwarding upon disconnection;
the automatic retransferring module is further arranged to, when the option of automatic offline-file forwarding upon disconnection is configured, send the file to a server for cache to allow the receiver receive the file or resume the interrupted transfer of the file from the server after the receiver goes on line in case that no response to confirm receiving by the receiver is received within a set period.

7. The terminal according to claim 6,
wherein the automatic retransferring module is further arranged to, when the option of automatic offline-file forwarding is configured and in case that no response to confirm receiving by the receiver is received within the set period, send automatically an offline file-retransfer or offline resuming-file-transfer request to the server before sending the file to the server.

8. A method for file transfer, comprising:
configuring an option of automatic reception upon disconnection for a receiver;
when transfer of a file is interrupted and an instant messaging terminal as the receiver is configured with an option of automatic reception upon disconnection, responding to automatically, by the instant messaging terminal which serves as the receiver, a file-retransfer or resuming-file-transfer request sent from a sender after detecting that the network connection is back to normal by sending the sender a response to confirm receiving, and receiving again the file, or resuming reception of the interrupted file;

in case that no response to confirm receiving is sent to the sender within a set period, triggering the sender configuring with an option of automatic offline-file forwarding upon disconnection to send the file to a server for cache to allow the receiver receive the file or resume the interrupted transfer of the file from the server after the receiver goes on line.

9. An instant messaging terminal, comprising:
a memory storing instructions; and
a hardware processor executing the instructions to implement a second configuring module and an automatic receiving module, wherein
the second configuring module is arranged to configure or cancel an option of automatic reception upon disconnection; and
the automatic receiving module is arranged to, when the option of automatic reception upon disconnection is configured and when transfer of a file is interrupted, respond to automatically a file-retransfer or resuming-file-transfer request sent from the sender after detecting that the network connection is back to normal by sending the sender a response to confirm receiving, and receive again the file, or resume reception of the interrupted file; and in case that no response to confirm receiving is sent to the sender within a set period, trigger the sender configuring with an option of automatic offline-file forwarding upon disconnection to send the file to a server for cache to allow the receiver receive the file or resume the interrupted transfer of the file from the server after the receiver goes on line.

10. An instant messaging terminal, comprising:
a memory storing instructions; and
a hardware processor executing the instructions to implement a first configuring module, an automatic retransferring module, a second configuring module and an automatic receiving module, wherein
the first configuring module is arranged to configure or cancel an option of automatic retransfer upon disconnection;
the automatic retransferring module is arranged to, when the option of automatic retransfer upon disconnection is configured and when transfer of a file is interrupted, monitor in real time whether the network connection is back to normal, send automatically an online file-retransfer or online resuming-file-transfer request to a receiver after detecting that the network connection is back to normal, and retransfer the file on line or resume on line the interrupted transfer of the file to the receiver after a response to confirm receiving by the receiver is received;
wherein the first configuring module is further arranged to configure or cancel an option of automatic offline-file forwarding upon disconnection;
the automatic retransferring module is further arranged to, when the option of automatic offline-file forwarding upon disconnection is configured, send the file to a server for cache to allow the receiver receive the file or resume the interrupted transfer of the file from the server after the receiver goes on line in case that no response to confirm receiving by the receiver is received within a set period;

the second configuring module is arranged to configure or cancel an option of automatic reception upon disconnection; and
the automatic receiving module is arranged to, when the option of automatic reception upon disconnection is configured and when transfer of a file is interrupted, respond to automatically a file-retransfer or resuming-file-transfer request sent from a sender after detecting that the network connection is back to normal by sending the sender a response to confirm receiving, and receive the whole file again, or resume reception of the interrupted file; and in case that no response to confirm receiving is sent to the sender within the set period, trigger the sender configuring with an option of automatic offline-file forwarding upon disconnection to send the file to the server for cache to allow the receiver receive the file or resume the interrupted transfer of the file from the server after the receiver goes on line.

11. A system for file transfer, comprising a first instant messaging terminal which serves as a file sender, a server, and a second instant messaging terminal which serves as a file receiver,
the first instant messaging terminal comprising:
a memory storing instructions; and
a hardware processor executing the instructions to implement a first configuring module and an automatic retransferring module, wherein
the first configuring module is arranged to configure or cancel an option of automatic retransfer upon disconnection; and
the automatic retransferring module is arranged to, when the option of automatic retransfer upon disconnection is configured and when transfer of a file is interrupted, monitor in real time whether the network connection is back to normal, send automatically an online file-retransfer or online resuming-file-transfer request to a receiver after detecting that the network connection is back to normal, and retransfer the file on line or resume on line the interrupted transfer of the file to the receiver after a response to confirm receiving by the receiver is received,
wherein the first configuring module is further arranged to configure or cancel an option of automatic offline-file forwarding upon disconnection;
the automatic retransferring module is further arranged to, when the option of automatic offline-file forwarding upon disconnection is configured, send the file to the server for cache to allow the receiver receive the file or resume the interrupted transfer of the file from the server after the receiver goes on line in case that no response to confirm receiving by the receiver is received within a set period;
the second instant messaging terminal comprising:
a memory storing instructions; and
a hardware processor executing the instructions to implement a second configuring module and an automatic receiving module, wherein
the second configuring module is arranged to configure or cancel an option of automatic reception upon disconnection; and
the automatic receiving module is arranged to, when the option of automatic reception upon disconnection is configured and when transfer of a file is interrupted due to the network connection interruption, respond to automatically a file-retransfer or resuming-file-transfer request sent from the sender after detecting that the network connection is back to normal by sending the sender a response to confirm receiving, land receive the whole file again, or resume reception of the interrupted file; and in case that no response to confirm receiving is sent to the sender within the set period, trigger the sender configuring with the option of automatic offline-file forwarding upon disconnection to send the file to the server for cache to allow the receiver receive the file or resume the interrupted transfer of the file from the server after the receiver goes on line.

* * * * *